United States Patent
Osqueizadeh

(10) Patent No.: US 10,445,275 B2
(45) Date of Patent: Oct. 15, 2019

(54) SYSTEM ON CHIP HAVING INTEGRATED SOLID STATE GRAPHICS CONTROLLERS

(71) Applicant: ATI Technologies ULC, Markham (CA)

(72) Inventor: Nima Osqueizadeh, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 15/582,479

(22) Filed: Apr. 28, 2017

(65) Prior Publication Data

US 2018/0181520 A1 Jun. 28, 2018

Related U.S. Application Data

(63) Continuation-in-part of application No. 15/389,596, filed on Dec. 23, 2016, and a continuation-in-part of application No. 15/389,747, filed on Dec. 23, 2016.

(51) Int. Cl.
*G06F 13/40* (2006.01)
*G06F 13/16* (2006.01)
*G06F 13/42* (2006.01)

(52) U.S. Cl.
CPC ...... *G06F 13/4022* (2013.01); *G06F 13/1668* (2013.01); *G06F 13/4068* (2013.01); *G06F 13/4282* (2013.01)

(58) Field of Classification Search
CPC combination set(s) only.
See application file for complete search history.

(56) References Cited

U.S. PATENT DOCUMENTS 5,968,143 A * 10/1999 Chisholm ............. G06F 13/126
710/23
8,996,781 B2 3/2015 Schuette et al.
2016/0364829 A1* 12/2016 Apodaca ................... G06T 1/20

* cited by examiner

*Primary Examiner* — Yong J Choe
(74) *Attorney, Agent, or Firm* — Volpe and Koenig, P.C.

(57) ABSTRACT

Described is a solid state graphics (SSG) subsystem including a die and a package, where the die includes a memory hub, graphics processing unit(s) (GPU(s)) connected to the memory hub, first memory architecture controller(s) connected to the memory hub and directly controlling access to first memory architecture(s), second memory architecture controller associated with each GPU and each second memory architecture controller connected to the memory hub and second memory architecture(s), an expansion bus first memory architecture controller connected to the memory hub and being an endpoint for a host system and an expansion bus controller coupled to the expansion bus first memory architecture controller and capable of connecting to the host system. The first memory architecture(s) and the second memory architecture(s) are either located on the SSG subsystem, located on the package, or a combination thereof.

18 Claims, 6 Drawing Sheets

SYSTEM ON CHIP HAVING INTEGRATED SOLID STATE GRAPHICS CONTROLLERS

CROSS-RELATED APPLICATIONS

This application is a continuation-in-part of U.S. patent application Ser. No. 15/389,596, filed Dec. 23, 2016 and U.S. patent application Ser. No. 15/389,747, filed Dec. 23, 2016, which are incorporated by reference as if fully set forth.

This application is related to U.S. patent application Ser. No. 15/389,811, filed Dec. 23, 2016 and U.S. patent application Ser. No. 15/389,908, filed Dec. 23, 2016, which are incorporated by reference as if fully set forth.

BACKGROUND

Graphics subsystems require interaction with a root complex of a host computing system to execute certain types of functions. For example, the transfer of data from non-volatile memory (NVM) to a graphics processing unit (GPU) local memory requires that the data is transferred from the NVM to a host memory, and then from the host memory to the local memory. This involves at least using a root complex of the host computing system. This taxes the root complex and increases traffic and congestion.

BRIEF DESCRIPTION OF THE DRAWINGS

A more detailed understanding may be had from the following description, given by way of example in conjunction with the accompanying drawings wherein.

DETAILED DESCRIPTION

Described herein is a system on a chip (SoC) having a graphics processing unit (GPU) with integrated solid state graphics (SSG) controllers. The SoC includes the GPU(s) or discrete GPU(s) (dGPU(s)) (collectively GPU(s)), first memory architecture controller(s), second memory architecture controller(s), and expansion bus first memory architecture controller(s) that are interconnected via a memory hub/data fabric. The SoC further includes an expansion bus interface that is connected to the expansion bus first memory architecture controller(s) and can be connected to a host system, for example.

The first memory architecture controller can be a non-volatile memory controller (NVM) controller or other similarly used memory controllers, for example. The second memory architecture controller can be a local memory controller, a high bandwidth memory (HBM) controller, a double data rate fourth-generation synchronous dynamic random-access memory (DDR4) controller, a double data rate type five synchronous graphics random access memory (GDDR5) controller, a hybrid memory cube controller or other similarly used memory controllers, for example. The expansion bus first memory architecture controller can be a Non-Volatile Memory (NVM) Express (NVMe) or Non-Volatile Memory Host Controller Interface Specification (NVMHCI) controller or other similarly used expansion bus architectures. For purposes of illustration and discussion, the terms NVM and local memory will be used in the description without limiting the scope of the specification and claims For purposes of illustration and discussion, dGPU may be used in the description without limiting the scope of the specification and claims.

Figure 1:
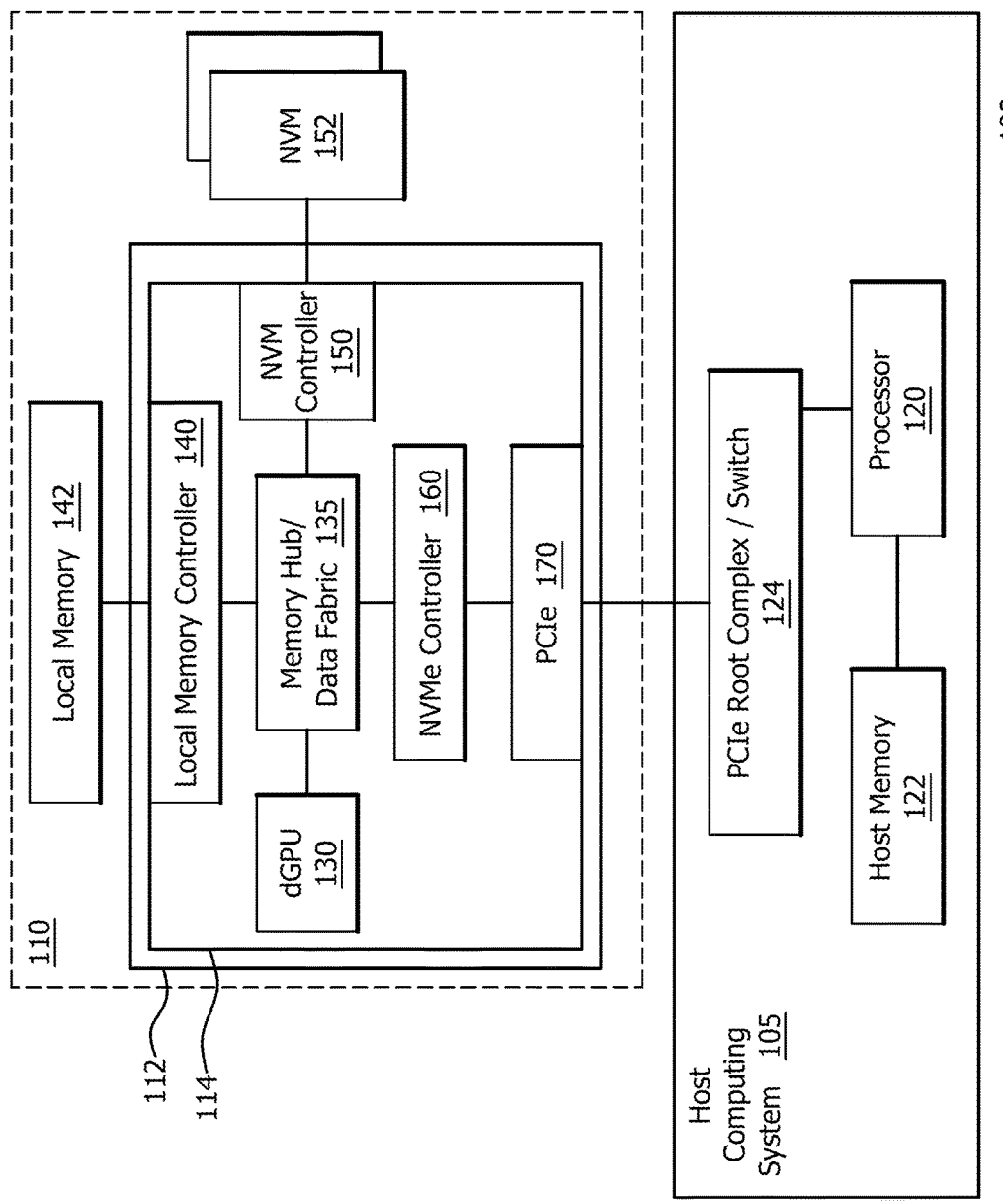
FIG. 1 is a processing system with a host computing system and a solid state graphics (SSG) subsystem with integrated controllers in accordance with certain implementations.

FIG. 1 shows an example processing system 100 in accordance with certain implementations. Processing system 100 can include a host computing system 105 that is connected to one or more SSG subsystems 110. SSG subsystem(s) 100 can be implemented in a variety of architectures including for example, as part of the board that includes host computing system 105, a standalone card or an external module.

Host computing system 105 includes a processor 120, such as for example a central processing unit (CPU), which may be connected to or in communication with (collectively "connected to") to a host memory 122, such as for example random access memory (RAM). The processor 120 can include an operating system (OS), a device driver and other nominal elements. The processor 120 can also be connected to a number of components that are known to one of ordinary skill in the art. The components may be connected to processor 120 using, for example, a high-speed serial computer expansion bus, such as but not limited to, a Peripheral Component Interconnect Express (PCIe) root complex 124. PCIe root complex 124 is shown for purposes of illustration and other electrical or communication interfaces may be used.

In general, each SSG subsystem 110 includes at least one semiconductor package 112, such as a GPU SoC package. Each semiconductor package 112 includes a die 114, such as for example, a GPU SoC die. Die 114 includes, for example, a dGPU 130 connected to a memory hub and/or data fabric (hereinafter "memory hub") 135. Memory hub 135 is a hub for communications between external interfaces such as local memory controller 140 and internal interfaces such as dGPU 130 and acts as a translator between the external and internal interfaces. In particular, memory hub 135 in connected to a local memory controller 140, a NVM controller 150 and a NVMe controller 160. NVMe controller 160 is further connected to at least one expansion bus controller, such as PCIe 170, for connection to PCIe root complex 124. PCIe 170 can be, for example, a PCIe interface controller or a PCI switch, where the PCIe interface controller generally provides an endpoint for each connection with a device and the PCIe switch can create multiple endpoints out of one endpoint to allow sharing one endpoint with multiple devices. Given the level of integration, a PCIe interface controller may be sufficient for most implementations.

Each of memory hub 135, local memory controller 140, NVM controller 150, NVMe controller 160 and PCIe 170 are integrated with dGPU 130 on die 114, (i.e., monolithic). Local memory controller 140 is connected to a local memory 142 and NVM controller 150 is connected to at least one NVM 152 via a multichannel direct interface. As the term is used herein, local memory 142 is local to dGPU 130. NVM controller 150 can manage and access at least one NVM 152 and in particular, can decode incoming commands from host computing system 105 or dGPU 130. In FIG. 1 implementation, local memory 142 and at least one NVM 152 are located on SSG subsystem 110. In an implementation, SSG subsystem 110 is user reconfigurable.

Illustration of die 114, package 112 and SSG subsystem 110 have been simplified to illustrate elements that are relevant for a clear understanding, while eliminating, for the purpose of clarity, many other elements found in die 114, package 112 and SSG subsystem 110. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Monolithic implementation of local memory controller 140, NVM controller 150 and NVMe controller 160 permit storage model or memory mapped model use of at least one NVM 152. In particular, integration of NVM controller 150 permits direct communication with and between NVMs 152. Likewise, integration of NVMe controller 160 permits exposure of at least one NVM 152 to host system 105 as a standard NVMe device. That is, NVMe controller 160 acts an endpoint for host system 105. In systems lacking this level of integration, the storage model and memory mapped model will be much more difficult because standard operating system (OS) file and storage services will not be immediately useable or have the functionality needed to implement these models. This level of integration permits using at least one NVM 152 as a form of storage because of the pre-existing drives that are installed with or as part of the operating system. Data can be easily moved to and from at least one NVM 152 without the need to add new hardware or software to a system using SSG subsystem 110, package 114 or die 112. Moreover, no further qualification is needed for the interfaces as each controller is integrated with the GPU on die 114. The monolithic implementation of the controllers provides a level and degree of integration that increases physical proximity of the components and decreases total area requirements on die 114. Moreover, power consumption is decreased.

Figure 2:
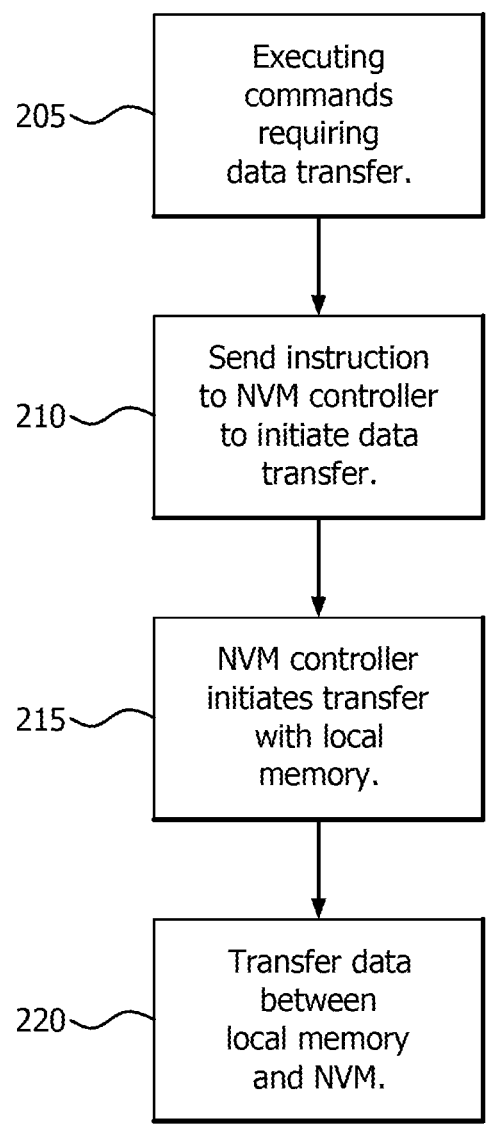
FIG. 2 is a flow chart using an SSG subsystem in accordance with certain implementations.

FIG. 2, in concert with FIG. 1, shows an example flowchart 200 for transferring data directly between local memory 140 and at least one NVM 152. As commands are executed by dGPU 130, certain commands may need access to at least one NVM 152 (step 205). A data transfer command is sent by processor 120 (via PCIe 170 and NVMe controller 160) or hardware agents in dGPU 130 to NVM controller 150 (step 210). The data transfer is initiated by NVM controller 150 (step 215). The data is then transferred between local memory 142 and at least one NVM 152 (step 220). In the event of data transfer between host memory 122 and at least one NVM 152, the same sequence is implemented except that the data transfer command is sent by processor 120 via PCIe 170 and NVMe controller 160 to NVM controller 150 and the data is transferred between host memory 122 and at least one NVM 152.

Figure 3:
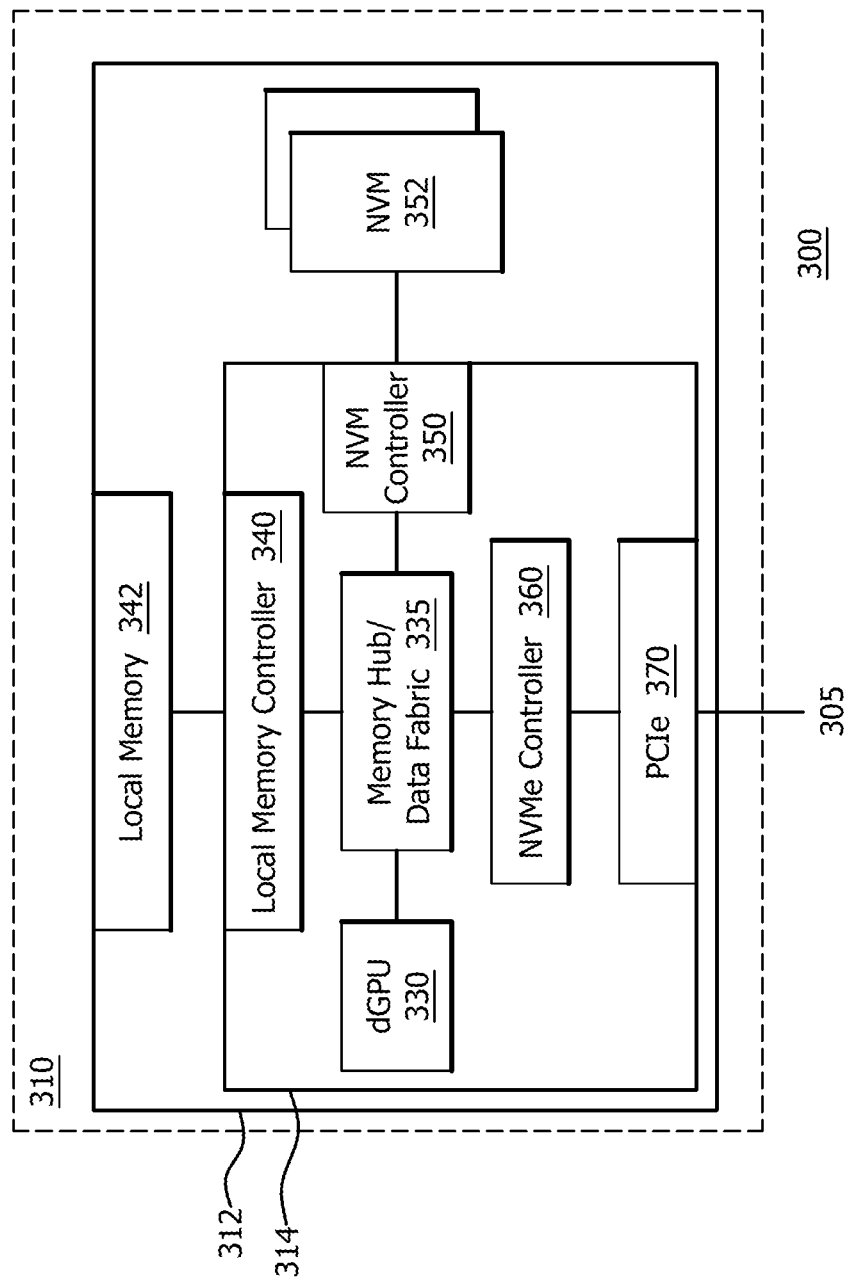
FIG. 3 is another SSG subsystem with a graphics processing unit (GPU) and integrated controllers in accordance with certain implementations.
Figure 4:
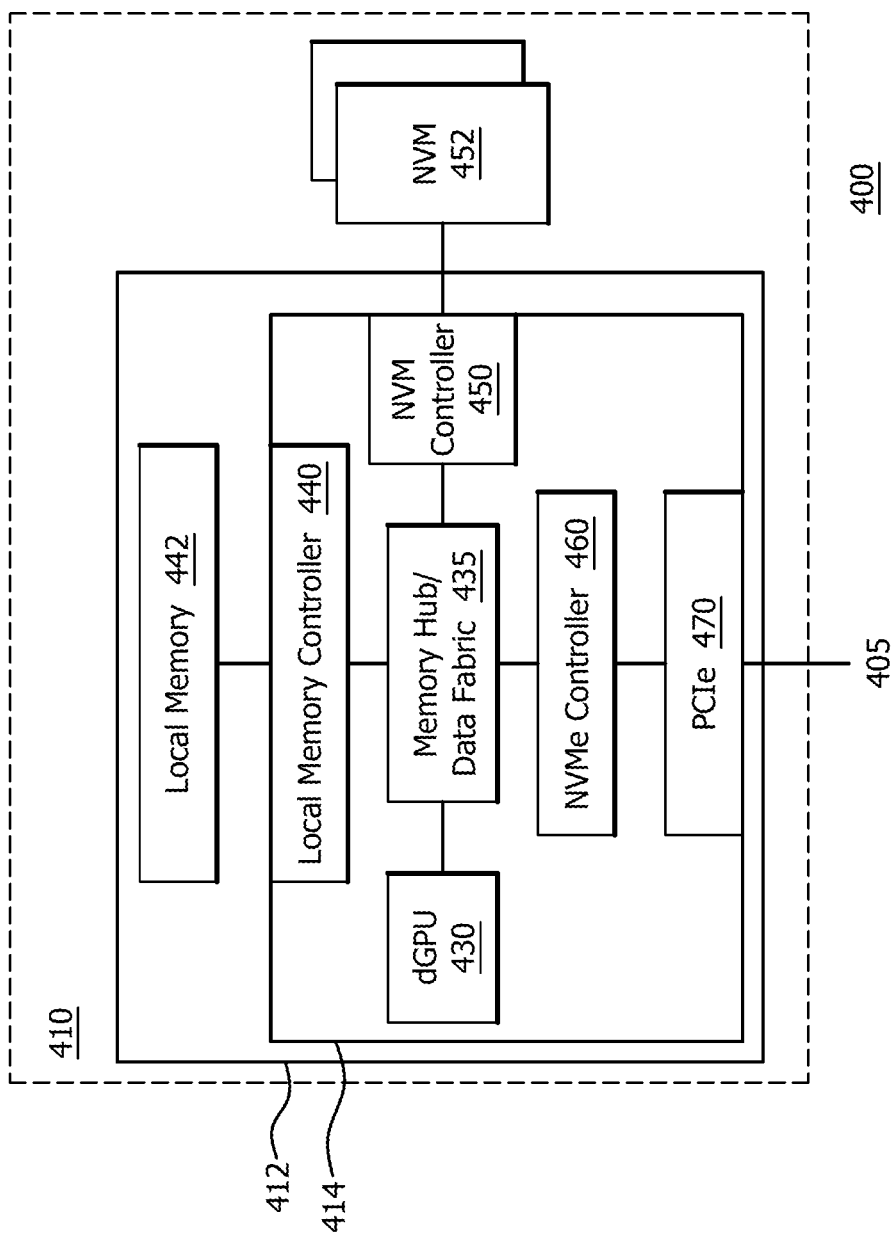
FIG. 4 is another SSG subsystem with a GPU and integrated controllers in accordance with certain implementations.
Figure 5:
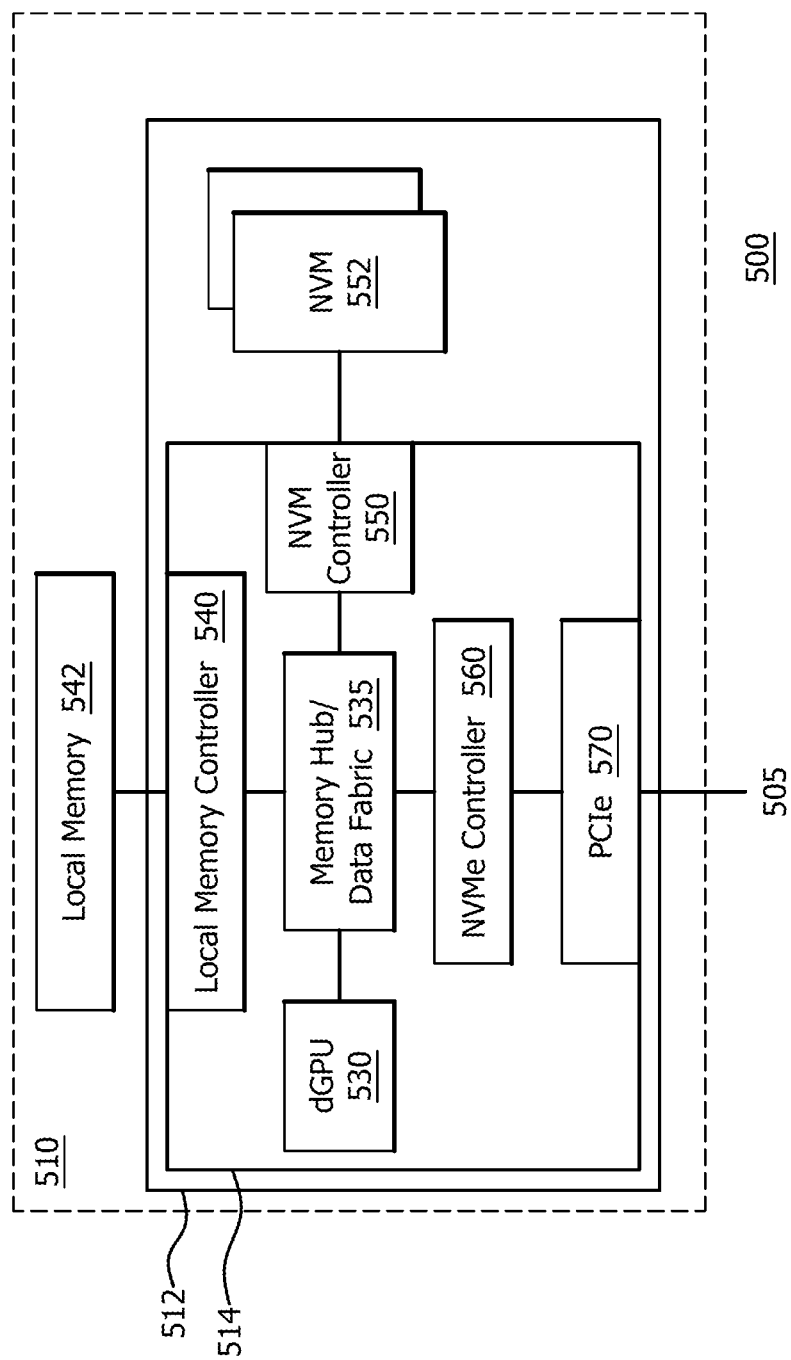
FIG. 5 is another SSG subsystem with a graphics processing unit (GPU) and integrated controllers in accordance with certain implementations.

Illustrative configurations for SSG subsystem 110 are described in FIGS. 3-5. Each implementation permits a different type of user or vendor configuration flexibility. Although the figures show a dGPU, any GPU can be used without departing from the scope of the specification or claims. These configurations are illustrative and other configurations can be implemented within the scope of the description and claims.

FIG. 3 illustrates an SSG subsystem 300 which includes at least one semiconductor package 312, such as a GPU SoC package. Each semiconductor package 312 includes a die 314, such as for example, a GPU SoC die. Die 314 includes, for example, a dGPU 330 connected to a memory hub and/or data fabric (hereinafter "memory hub") 335. Memory hub 335 in connected to a local memory controller 340, a NVM controller 350 and a NVMe controller 360. NVMe controller 360 is further connected to a PCIe interface 370 for connection to PCIe switch in host system 305. Each of memory hub 335, local memory controller 340, NVM controller 350, NVMe controller 360 and PCIe interface 370 are integrated with dGPU 330 on die 314, (i.e., monolithic). Local memory controller 340 is connected to a local memory 342 and NVM controller 350 is connected to at least one NVM 352 via a multichannel direct interface. As the term is used herein, local memory 342 is local to dGPU 330. NVM controller 350 can manage and access at least one NVM 352 and in particular, can decode incoming commands from host computing system 305 or dGPU 330. In an implementation, local memory 342 and at least one NVM 352 are integrated on package 312.

Operationally, SSG subsystem 300 functions as described herein above with respect to FIGS. 1 and 2. In particular, FIG. 2, in concert with FIG. 3, shows an example flowchart 200 for transferring data directly between local memory 340 and at least one NVM 352. As commands are executed by dGPU 330, certain commands may need access to at least one NVM 352 (step 205). A data transfer command is sent by a processor in host system 305 (via PCIe 370 and NVMe controller 360) or hardware agents in dGPU 330 to NVM controller 350 (step 210). The data transfer is initiated by NVM controller 350 (step 215). The data is then transferred between local memory 342 and at least one NVM 352 (step 220). In the event of data transfer between a host memory in host system 305 and at least one NVM 352, the same sequence is implemented except that the data transfer command is sent by the processor in host system 305 via PCIe 370 and NVMe controller 360 to NVM controller 350 and the data is transferred between the host memory in host system 305 and at least one NVM 352.

FIG. 4 illustrates an SSG subsystem 400 which includes at least one semiconductor package 412, such as a GPU SoC package. Each semiconductor package 412 includes a die 414, such as for example, a GPU SoC die. Die 414 includes, for example, a dGPU 430 connected to a memory hub and/or data fabric (hereinafter "memory hub") 435. Memory hub 435 in connected to a local memory controller 440, a NVM controller 450 and a NVMe controller 460. NVMe controller 460 is further connected to a PCIe interface 470 for connection to PCIe switch in host system 405. Each of memory hub 435, local memory controller 440, NVM controller 450, NVMe controller 460 and PCIe interface 470 are integrated with dGPU 430 on die 414, (i.e., monolithic). Local memory controller 440 is connected to a local memory 442 and NVM controller 450 is connected to at least one NVM 452 via a multichannel direct interface. As the term is used herein, local memory 442 is local to dGPU 430. NVM controller 450 can manage and access at least one NVM 452 and in particular, can decode incoming commands from host computing system 405 or dGPU 430. In an implementation, local memory 442 is integrated on package 412 and at least one NVM 452 is located on SSG subsystem 410.

Operationally, SSG subsystem 400 functions as described herein above with respect to FIGS. 1 and 2. In particular, FIG. 2, in concert with FIG. 4, shows an example flowchart 200 for transferring data directly between local memory 440 and at least one NVM 452. As commands are executed by dGPU 430, certain commands may need access to at least one NVM 452 (step 205). A data transfer command is sent by a processor in host system 405 (via PCIe 470 and NVMe controller 460) or hardware agents in dGPU 430 to NVM controller 450 (step 210). The data transfer is initiated by NVM controller 450 (step 215). The data is then transferred between local memory 442 and at least one NVM 452 (step 220). In the event of data transfer between a host memory in host system 405 and at least one NVM 452, the same sequence is implemented except that the data transfer command is sent by the processor in host system 405 via PCIe 470 and NVMe controller 460 to NVM controller 450 and the data is transferred between the host memory in host system 405 and at least one NVM 452.

FIG. 5 illustrates an SSG subsystem 500 which includes at least one semiconductor package 512, such as a GPU SoC package. Each semiconductor package 512 includes a die 514, such as for example, a GPU SoC die. Die 514 includes, for example, a dGPU 530 connected to a memory hub and/or data fabric (hereinafter "memory hub") 535. Memory hub 535 in connected to a local memory controller 540, a NVM controller 550 and a NVMe controller 560. NVMe controller 560 is further connected to a PCIe interface 570 for connection to PCIe switch in host system 505. Each of memory hub 535, local memory controller 540, NVM controller 550, NVMe controller 560 and PCIe interface 570 are integrated with dGPU 530 on die 514, (i.e., monolithic). Local memory controller 540 is connected to a local memory 542 and NVM controller 550 is connected to at least one NVM 552 via a multichannel direct interface. As the term is used herein, local memory 542 is local to dGPU 530. NVM controller 550 can manage and access at least one NVM 552 and in particular, can decode incoming commands from host computing system 505 or dGPU 530. In an implementation, local memory 542 is located on SSG subsystem 510 and at least one NVM 552 is integrated on package 512.

Operationally, SSG subsystem 500 functions as described herein above with respect to FIGS. 1 and 2. In particular, FIG. 2, in concert with FIG. 5, shows an example flowchart 200 for transferring data directly between local memory 540 and at least one NVM 552. As commands are executed by dGPU 530, certain commands may need access to at least one NVM 552 (step 205). A data transfer command is sent by a processor in host system 505 (via PCIe 570 and NVMe controller 560) or hardware agents in dGPU 530 to NVM controller 550 (step 210). The data transfer is initiated by NVM controller 550 (step 215). The data is then transferred between local memory 542 and at least one NVM 552 (step 220). In the event of data transfer between a host memory in host system 505 and at least one NVM 552, the same sequence is implemented except that the data transfer command is sent by the processor in host system 505 via PCIe 570 and NVMe controller 560 to NVM controller 550 and the data is transferred between the host memory in host system 505 and at least one NVM 552.

Figure 6:
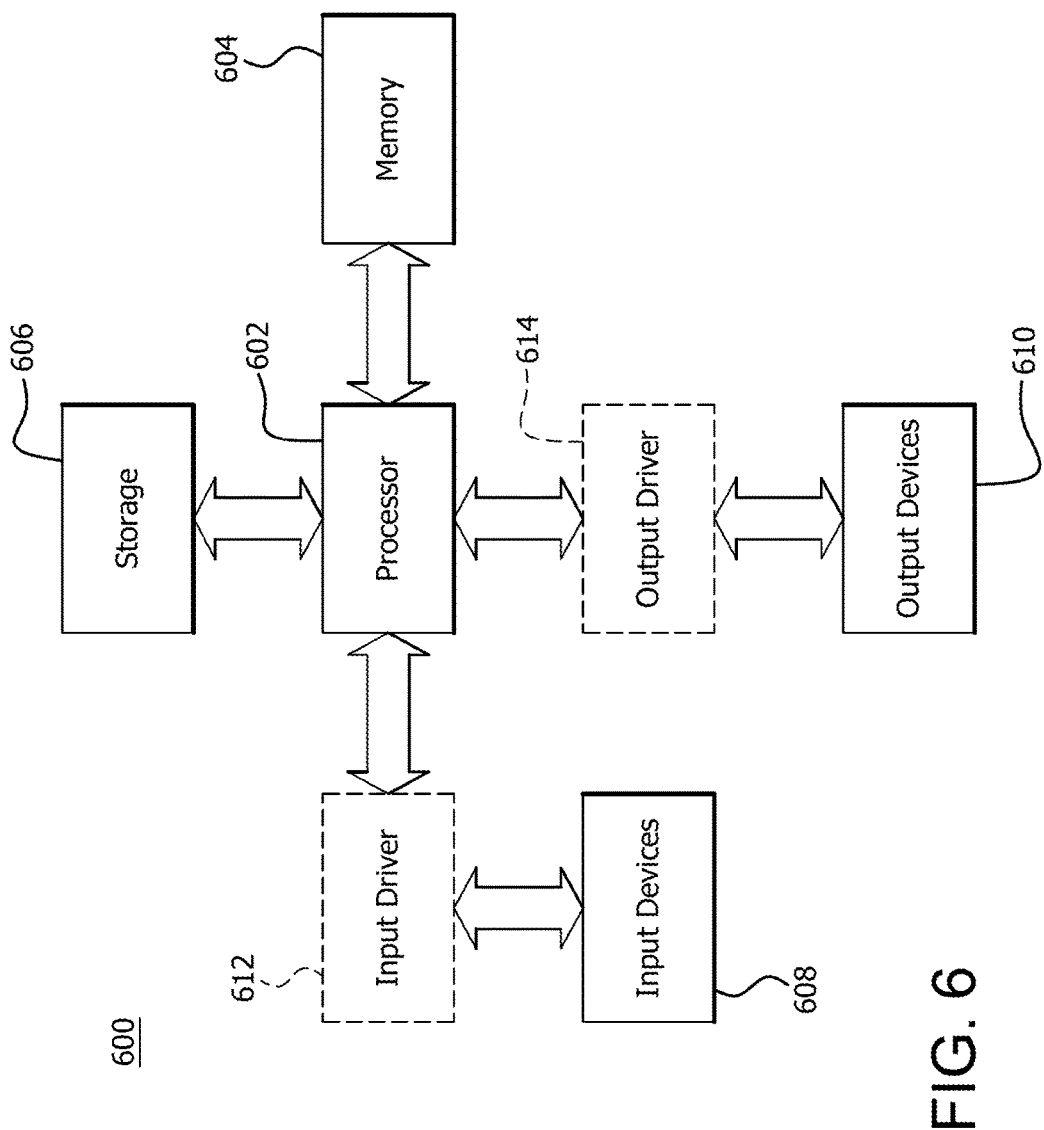
FIG. 6 is a block diagram of an example device in which one or more disclosed implementations may be implemented.

FIG. 6 is a block diagram of an example device 600 in which one portion of one or more disclosed implementations may be implemented. The device 600 may include, for example, a head mounted device, a server, a computer, a gaming device, a handheld device, a set-top box, a television, a mobile phone, or a tablet computer. The device 600 includes a processor 602, a memory 604, a storage 606, one or more input devices 608, and one or more output devices 610. The device 600 may also optionally include an input driver 612 and an output driver 614. It is understood that the device 600 may include additional components not shown in FIG. 6.

The processor 602 may include a central processing unit (CPU), a graphics processing unit (GPU), a CPU and GPU located on the same die, or one or more processor cores, wherein each processor core may be a CPU or a GPU. The memory 604 may be located on the same die as the processor 602, or may be located separately from the processor 602. The memory 604 may include a volatile or non-volatile memory, for example, random access memory (RAM), dynamic RAM, or a cache.

The storage 606 may include a fixed or removable storage, for example, a hard disk drive, a solid state drive, an optical disk, or a flash drive. The input devices 608 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 310 may include a display, a speaker, a printer, a haptic feedback device, one or more lights, an antenna, or a network connection (e.g., a wireless local area network card for transmission and/or reception of wireless IEEE 802 signals).

The input driver 612 communicates with the processor 602 and the input devices 608, and permits the processor 602 to receive input from the input devices 608. The output driver 614 communicates with the processor 602 and the output devices 610, and permits the processor 602 to send output to the output devices 610. It is noted that the input driver 612 and the output driver 614 are optional components, and that the device 600 will operate in the same manner if the input driver 612 and the output driver 614 are not present.

In general and without limiting implementations described herein, a computer readable non-transitory medium including instructions which when executed in a processing system cause the processing system to execute a method for transferring data directly from a second memory architecture associated with a GPU to a first memory architecture.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A solid state graphics (SSG) die, comprising:
a memory hub;
at least one graphics processing unit (GPU) connected to the memory hub;
a first memory architecture controller connected to the memory hub, the first memory architecture controller directly controlling access to at least one first memory architecture, wherein the at least one first memory architecture is local to the GPU;
a second memory architecture controller associated with each GPU, each second memory architecture controller connected to the memory hub and at least one second memory architecture;
an expansion bus first memory architecture controller connected to the memory hub, the expansion bus first memory architecture controller being an endpoint for the host system; and
an expansion bus controller coupled to the expansion bus first memory architecture controller that exposes the at least one second memory architecture to the host system,
wherein the first memory architecture controller is configured to transfer data between the first memory architecture and the second memory architecture in response to a data transfer command received from the host system via the expansion bus controller.

2. The SSG die of claim 1, wherein the die is a component on a SSG subsystem and the at least one first memory architecture and the at least one second memory architecture are located on the SSG subsystem.

3. The SSG die of claim 1, wherein the die is a component on a SSG package and the at least one first memory architecture and the at least one second memory architecture are located on the SSG package.

4. The SSG die of claim 1, wherein the die is a component on a SSG package and the SSG package is a component on a SSG subsystem, the at least one first memory architecture is located on the SSG package and the at least one second memory architecture is located on the SSG subsystem.

5. The SSG die of claim 1, wherein the die is a component on a SSG package and the SSG package is a component on a SSG subsystem, the at least one first memory architecture is located on the SSG subsystem and the at least one second memory architecture is located on the SSG package.

6. The SSG die of claim 1, wherein the first memory architecture is a non-volatile memory (NVM) and the second memory architecture is local memory.

7. The SSG die of claim 1, wherein the expansion bus controller is one of an expansion bus interface controller and an expansion bus switch.

8. The SSG die of claim 1, wherein the die is a component on a SSG subsystem and the SSG subsystem is a SSG card.

9. The SSG subsystem of claim 8, wherein the die is a component on a SSG subsystem and the SSG subsystem is located on a board hosting the host system.

10. A solid state graphics (SSG) subsystem, comprising:
a die; and
a package including the die,
wherein the die comprises:
a memory hub;
at least one graphics processing unit (GPU) connected to the memory hub;
first memory architecture controllers connected to the memory hub, each first memory architecture controller directly controlling access to at least one first memory architecture, wherein the at least one first memory architecture is local to the GPU;
a second memory architecture controller associated with each GPU, each second memory architecture controller connected to the memory hub and at least one second memory architecture;
at least one expansion bus first memory architecture controller connected to the memory hub, each expansion bus first memory architecture controller being an endpoint for a host system; and
an expansion bus controller coupled to the expansion bus first memory architecture controller that exposes the at least one second memory architecture to the host system, and
controller is configured to transfer wherein the first memory architecture data between the first memory architecture and the second memory architecture in response to a data transfer command received from the host system via the expansion bus controller.

11. The SSG subsystem of claim 10, wherein the at least one first memory architecture and the at least one second memory architecture are located on the SSG subsystem.

12. The SSG subsystem of claim 10, wherein the at least one first memory architecture and the at least one second memory architecture are located on the package.

13. The SSG subsystem of claim 10, wherein the at least one first memory architecture is located on the package and the at least one second memory architecture is located on the SSG subsystem.

14. The SSG subsystem of claim 10, wherein the at least one first memory architecture is located on the SSG subsystem and the at least one second memory architecture is located on the package.

15. The SSG subsystem of claim 10, wherein the first memory architecture is a non-volatile memory (NVM) and the second memory architecture is local memory.

16. The SSG subsystem of claim 10, wherein the expansion bus controller is one of an expansion bus interface controller and an expansion bus switch.

17. The SSG subsystem of claim 10, wherein the SSG subsystem is a SSG card.

18. The SSG subsystem of claim 10, wherein the SSG subsystem is located on a board hosting the host system.

* * * * *